W. C. OQUIST.
BICYCLE SHOCK ABSORBER.
APPLICATION FILED AUG. 19, 1910.

1,000,115.

Patented Aug. 8, 1911.

Witnesses.
S. H. Clark
N. L. Lockwood

Inventor
Willard C. Oquist.
By Louis M. Schmidt
Atty.

COLUMBIA PLANOGRAPH CO., WASHINGTON, D. C.

UNITED STATES PATENT OFFICE.

WILLARD C. OQUIST, OF NEW BRITAIN, CONNECTICUT, ASSIGNOR OF ONE-HALF TO LOUIS M. SCHMIDT, OF NEW BRITAIN, CONNECTICUT.

BICYCLE SHOCK-ABSORBER.

1,000,115. Specification of Letters Patent. Patented Aug. 8, 1911.

Application filed August 19, 1910. Serial No. 577,959.

*To all whom it may concern:*

Be it known that I, WILLARD C. OQUIST, a citizen of the United States, residing at New Britain, in the county of Hartford and State of Connecticut, have invented certain new and useful Improvements in Bicycle Shock-Absorbers, of which the following is a specification.

My invention relates to improvements in bicycle shock absorbers and the objects of my improvements are simplicity and economy in construction and convenience and efficiency in use.

Figure 1:
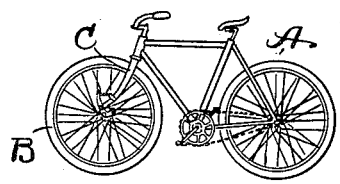
Figure 2:
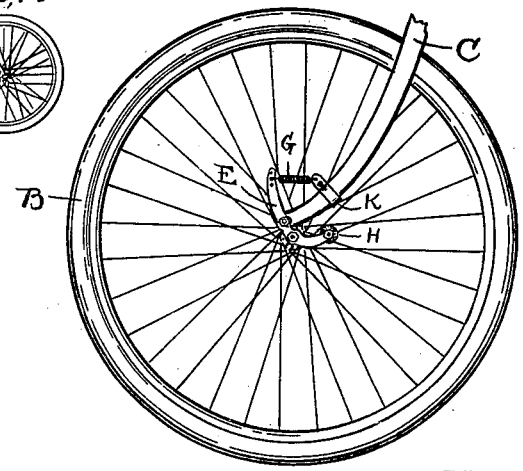
Figure 3:
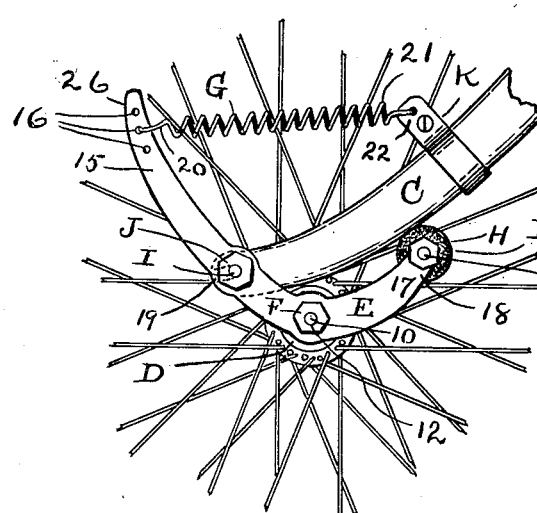
Figure 4:
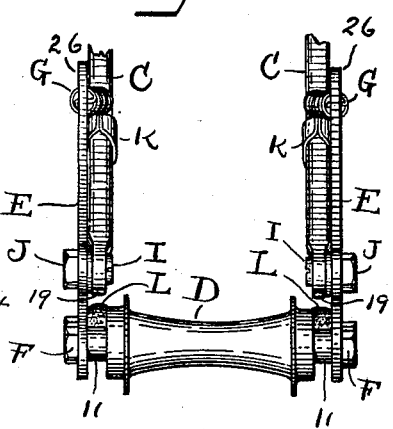
Figure 8:
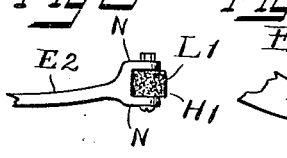
Figures 6, 7:
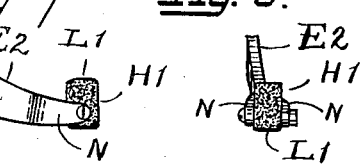
Figure 5:
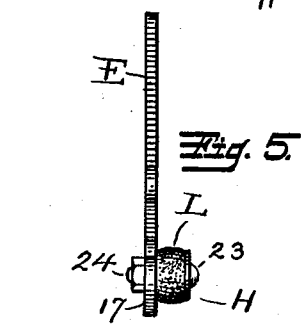
Figure 9:
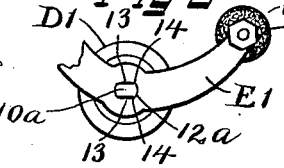

In the accompanying drawing:—Figure 1 is a side elevation of a bicycle having my shock absorber. Fig. 2 is a similar view on an enlarged scale of the shock absorber and part of the bicycle shown in Fig. 1. Fig. 3 is a similar view on a still larger scale of certain parts shown in Fig. 2, in a different relative position. Fig. 4 is a front view of the parts shown in Fig. 3. Fig. 5 is a detail view of a side frame and back stop. Fig. 6 is a rear elevation, Fig. 7 is a side elevation, and Fig. 8 is a plan view of a modification of the side frame and back stop. Fig. 9 is a side elevation of part of a modification of a side frame and shaft.

A is a bicycle having a front wheel B and a pair of front forks C. The said front wheel is provided with a shaft D on which the said wheel is rotatively mounted in the usual manner, the said shaft having laterally projecting ends 10, which ends are adapted to receive a pair of side bars E and to be secured thereto by means of nuts F, which nuts serve to clamp the said side bars against suitable enlargements 11 on the said shaft. The said side bars E constitute the main frame for my shock absorber and are preferably made of heavy sheet metal and of formation somewhat horn or crescent shaped and they are secured to the said shaft ends 10 at a point intermediate their ends by means of a hole 12 which is a fit for the said shaft end 10. The said hole may be in the form of a slot 12$^a$ having parallel sides 13 which may fit an end 10$^a$ of the shaft having flattened sides 14 and which will insure a positive rigid union of the two side bars E$^1$ and the shaft D$^1$ and parallelism of action of the two bars as a unit. The forward horn 15 of the side bars E in each case is turned generally upward and has in its free end 26 means for securing one end of a spring G which may consist of a hole 16, or a multiple of such holes. Intermediate the said free end 26 of the side bar E and the hole 12 at which is located the shaft D there is provided means for pivotally receiving the said fork C, which means may consist of shaft I in the form of a bolt and a nut J, the said shaft I engaged with a slot 19 in the said fork C and at the extreme lower end thereof. The rear horn 17 extends generally backwardly from the said hole 12 and has its extreme rearward end 18 turned upward, which end is provided with means for supporting a back stop H. The said spring G has its forward end 20 secured to the said side bar E as described and is secured by the rear end 21 to the fork C either directly or by a clamp K, the point of attachment 22 being appreciably above the point of pivotal attachment of the fork with the said fork shaft I. The said back stop H comprises a pin 23 rigidly secured by one end 24 to the said rear arm 17 of the side bar E and extends inwardly therefrom so that the general body is in alinement with the said fork C and which body is provided with a cushion surface consisting of a covering of rubber L.

Normally when weight is applied to the forks C the same is resiliently sustained through the medium of the side bars E and the springs G, and the said back stop H is separated from the fork C by clear space. In the case of an abnormal load beyond that for which the said springs G are adapted and liable to strain and damage the same the said fork C will come in contact with the said back stop H which will positively stop further relative motion of the side bar E and the fork C, and will do this with some resiliency, due to that of the rubber L and the said rear horn or arm 17. Accordingly, as described, under normal conditions the said springs G serve to absorb and eleminate sudden jars and shocks due to moderate unevenness of roadway and the back stops H serve to limit the relative motion of the connected parts so as to prevent injury and damage to the same under abnormal conditions.

In the back stop H$^1$ shown in Figs. 6, 7 and 8 the rubber L¹ is secured to side arms E² by means of a pair of side clamping wings N.

I claim as my invention:—

A shock absorbing mechanism adapted to connect a bicycle wheel with a pair of forks comprising a shaft operatively connected to the said wheel, side frames connected to the ends of the said shaft and having arms forwardly directed and arms backwardly directed relatively to the said shaft, the said forks directly connected to the said forward arms at one point and also adjustably connected to the said forward arms at another point by means of springs whereby the said springs serve to resiliently support the said forks under normal conditions, and the said backwardly directed arms having their ends adjacent the said forks and provided with means for engaging therewith under abnormal conditions of load.

WILLARD C. OQUIST.

Witnesses:
SHEFFIELD H. CLARKE,
NEWTON L. LOCKWOOD.

Copies of this patent may be obtained for five cents each, by addressing the "Commissioner of Patents, Washington, D. C."